(12) United States Patent
André

(10) Patent No.: US 6,415,143 B1
(45) Date of Patent: Jul. 2, 2002

(54) METHOD AND DEVICE FOR CALL TRANSFER

(75) Inventor: Jean-Marie André, Le Mans (FR)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/104,902

(22) Filed: Jun. 25, 1998

(30) Foreign Application Priority Data

Jul. 22, 1997 (FR) .............................. 97 09292

(51) Int. Cl.⁷ ................................. H04Q 7/20
(52) U.S. Cl. ................... 455/417; 455/403; 455/414
(58) Field of Search ................ 455/403, 417, 455/414, 571, 573, 552, 577

(56) References Cited

U.S. PATENT DOCUMENTS 5,379,339 A * 1/1995 Sakamoto ................. 455/461
5,799,067 A * 8/1998 Kikinis et al. ........... 379/93.06
5,915,224 A * 6/1999 Jonsson ..................... 455/552

FOREIGN PATENT DOCUMENTS

| EP | 0740482 A1 | 10/1996 |
| FR | 0639034 A1 | 2/1995 |
| GB | 2297455 A | 7/1996 |

* cited by examiner

*Primary Examiner*—Thanh Cong Le
*Assistant Examiner*—Alan T. Gantt
(74) *Attorney, Agent, or Firm*—Dicran Halajian

(57) ABSTRACT

The invention discloses a method of transferring calls from a first station of a first telecommunications network (PSTN) including integrated call transfer means to a mobile station connected to a radio communications network. An auxiliary device is intended to automatically trigger a call transfer activation and/or deactivation control by transmitting predefined messages from the auxiliary device which have integrated network transfer means (PSTN) for their destination. The auxiliary device may advantageously be used in a charger of a mobile station and thus it includes detection means for detecting the presence of the mobile station for automatically triggering a call transfer when the station does not rest on its charger.

11 Claims, 2 Drawing Sheets

METHOD AND DEVICE FOR CALL TRANSFER

FIELD OF THE INVENTION

The invention relates to a method of transferring calls from a first station of a first telecommunications network comprising integrated call transfer means to a second station, while an auxiliary device automatically triggers an activation and/or deactivation control for said call transfer.

The invention also relates to a device intended to carry out call transfers from a station of a telecommunications network comprising integrated call transfer means to a mobile station of a radio communications network.

The invention is advantageously applied to call transfers effected between a fixed station of the conventional public switched network and a mobile station connected to a radio telecommunications network.

BACKGROUND OF THE INVENTION

Such a method and device for call transfer are known notably from European patent application no. 0 639 034 A1. This document describes a method and a device for transferring calls from a mobile station of a radio communications network to another station. The call transfer is effected via the mobile station which communicates with the network by radio for this purpose. Call transfer instructions are then transmitted from the mobile station to call transfer means integrated with said radio communications network.

This method thus makes it necessary that all the incoming calls are intended for the mobile station which then automatically switches them to another station via the integrated transfer means of the radio communications network if the conditions for triggering a call transfer are satisfied.

This method, however, has a major drawback when the communication rates to a number of a mobile station are roughly higher than those intended for a fixed station number (which is currently the case). More particularly, in the case where an occasional use of a mobile station is provided, it is more advantageous for the calls to be systematically received by the fixed station and then transferred to the mobile station as required.

Indeed, according to the method described in cited document, the calling party always pays the price of a communication to a mobile station whatever the final receiving station. This may be detrimental in the case of calls of clients to a service provider who has a very competitive activity. The kind of example where this method is not satisfactory is that of a client choosing haphazardly a car service in his town in a telephone directory. The numbers of mobile stations being special numbers, the client will have a tendency of calling first a number of a fixed station.

SUMMARY OF THE INVENTION

It is an object of the invention to remedy this detrimental effect by providing a method and a device for call transfer which reduces the overcharge of the communications to a mobile station for the calling party. With this object, only the call number of the station to which a call costs the least is communicated to the calling parties. The call transfers are then automatically effected from this station to the mobile station to which the user can be connected and the cost of the communication from the first station to the mobile station is then billed to the called party.

The invention further provides to use call transfer means existing in a telecommunications network to which a station called fixed station whose incoming communications are not expensive is connected and to control these call transfer means by remote control in a manner transparent to the calling party via an auxiliary electronic device connected to this network.

For this purpose, a method of the type mentioned in the opening paragraph is characterized in that said control is triggered by the transmission of predefined messages from said auxiliary device which have said integrated transfer means for their destination.

According to an important characteristic feature of the invention, a method of the type described above is characterized in that it comprises a detection step for detecting the presence of said mobile radio station by said auxiliary device for triggering said control. Thus, when the mobile station is detected, the calls are normally received by the fixed station. If not, they are automatically transferred from the fixed station to the mobile station at the expense of the called party.

The invention also provides an auxiliary device as mentioned in the opening paragraph, characterized in that it comprises means for transmitting call transfer activation and/or deactivation messages to said integrated transfer means and means for keeping said messages in the memory.

Preferably, this device is integrated with a battery charger intended to receive a mobile station.

These and other aspects of the invention will be apparent from and elucidated with reference to the embodiments described hereinafter.

BRIEF DESCRIPTION OF THE DRAWINGS

In the drawings.

In these Figures, like elements carry like references.

DETAILED DESCRIPTION OF THE INVENTION

Figures 1A, 1B:
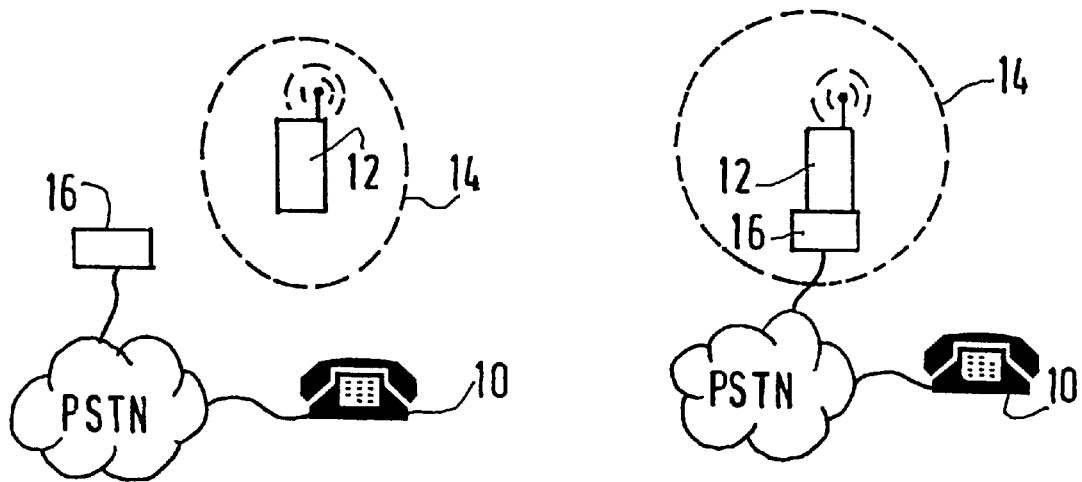
FIGS. 1A and 1B illustrate two different situations in which a method is implemented according to the invention.

FIGS. 1A and 1B, a fixed station 10 is connected to the Public Switched Telephone Network PSTN and is given a call number Y on this network. A mobile station (or radio telephone) 12 functioning on rechargeable batteries is connected to a mobile radio communications network 14, for example, according to the GSM standard (Global System for Mobile communications). Its call number is denoted X. A recharging (or charging) device 16 intended to receive the telephone 12 for recharging its batteries is also connected to the PSTN network. According to a variant of the embodiment of the invention, the station 10 and the charger 16 may be connected to the same telephone line.

According to the principle of the invention, the user, for example, a car mechanic, desires that the communications received on his radio telephone are billed to him. Thus, he only informs his interested parties of the number Y of his fixed station. Thanks to the call transfer method according to the invention, the communications received by his fixed station while he is moving around with his radio telephone are transferred to the call number X of the radio telephone.

In the first situation illustrated in FIG. 1A, it is supposed that the user is carrying out a car repair outside and has taken along his radio telephone in order to be connected. The charger has then detected the absence of the radio telephone and has thus activated the call transfer to the number X.

In the second situation illustrated in B in FIG. 1, the user is in the premises and his radio telephone is placed on its charger. This charger has detected its presence and has thus deactivated the call transfer.

Figure 2:
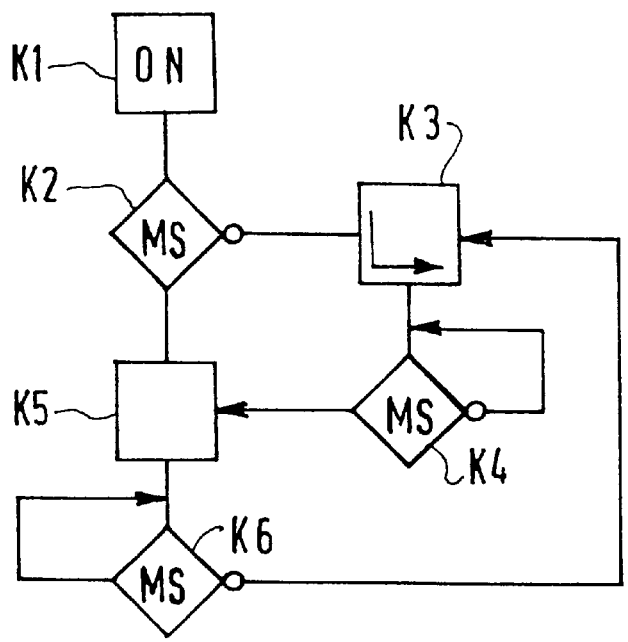
FIG. 2 illustrates an embodiment of the method according to the invention.

FIG. 2 illustrates an embodiment of the method according to the invention. In box K1 (ON) the charger is switched on. Adapter means permit of the detection of the presence of the mobile station MS on the charger 16. These means will be described in detail in FIGS. 3 and 4. A first test of detecting the presence of the radio telephone is carried out in box K2.

If the result of this test is negative, the method is proceeded with box K3 in that a call transfer is triggered. An activation message is then sent to the call transfer means existing inside the network PSTN. According to the preferred embodiment of the invention, this message consists of a DTMF sequence (Dual Tone Multifrequency) transmitted from the charger over the PSTN network. This sequence contains the digital information signals necessary for activating a transfer in accordance with the procedure required by the PSTN network and also an information signal containing a call number X of the radio telephone to which the communications are to be transferred. This sequence is first stored in a memory in the charger and is then transmitted over the PSTN network upon the activation instruction of the charger which charger is triggered by the fact that the absence of the mobile telephone 12 on its charger is detected.

Once the transfer has been effected, the method proceeds to box K4 where the detection means of the charger periodically or continuously test the presence of the mobile station. The method remains in this state as long as the presence of the mobile station has not been detected. The detection of the presence of the mobile station thus puts the method in the state represented in box K5.

If the result of the first test K2 is positive, the method carries on with box K5 with the deactivation of the call transfer. A deactivation sequence DTMF is sent by means of a call transfer of the PSTN network in accordance with the procedure required by the PSTN network. Then a new test for detecting the presence of the mobile station is carried out in box K6. The method remains in this state as long as the absence of the mobile station has not been detected. If the charger in effect detects the absence of the mobile station, box K3 is proceeded to where the call transfer is activated.

In a variant of an embodiment of the method according to the invention, while each call transfer activation or deactivation occurs (in the respective states K3 and K5) after a detection of the absence or presence of the mobile station, this call transfer activation or deactivation is not triggered until after a certain period of time which comprises the counting down of a time delay followed by a confirmation of this detection. The role of this time delay is to avoid detection errors and release an instruction each time the radio telephone is disconnected from its charger for a brief period of time.

Figure 3:
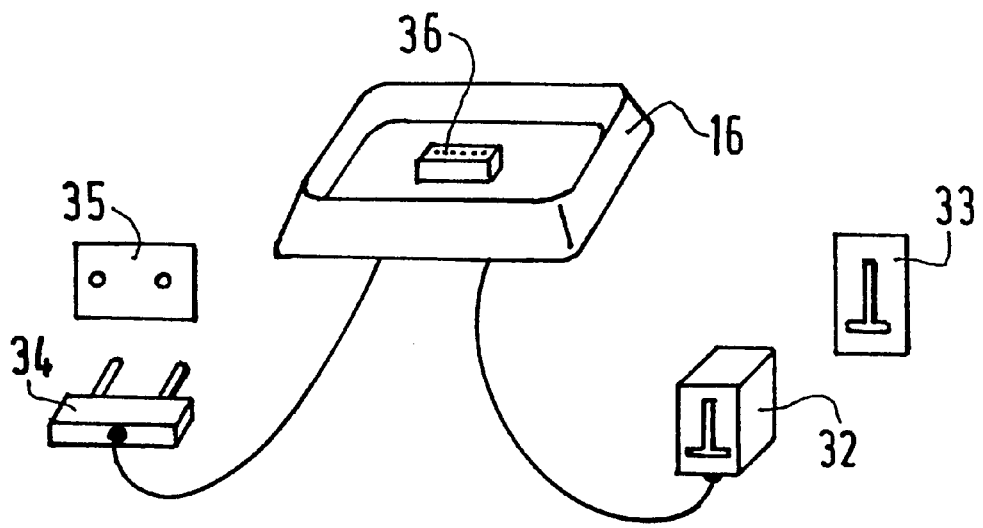
FIG. 3 represents an embodiment of the call transfer device according to the invention.

FIG. 3 shows how the charger 16 is connected to the PSTN network via a standardized connector 32 and a terminal 33 and how it is connected to a supply source by a male plug 34 and a female plug 35.

A male charge connector 36 comprising various pins is intended to co-operate with a female charge connector of the radio telephone to form a recharging loop and thus transmit the charge current from the charger to the batteries of the radio telephone. According to the preferred embodiment of the invention, the connector 36 also includes means for detecting the presence of the radio telephone on the charger. These means will be described with reference to FIG. 4.

For using the device 16 only for its function of charger, it is sufficient to disconnect the connector 32 from the terminal 33.

Figure 4:
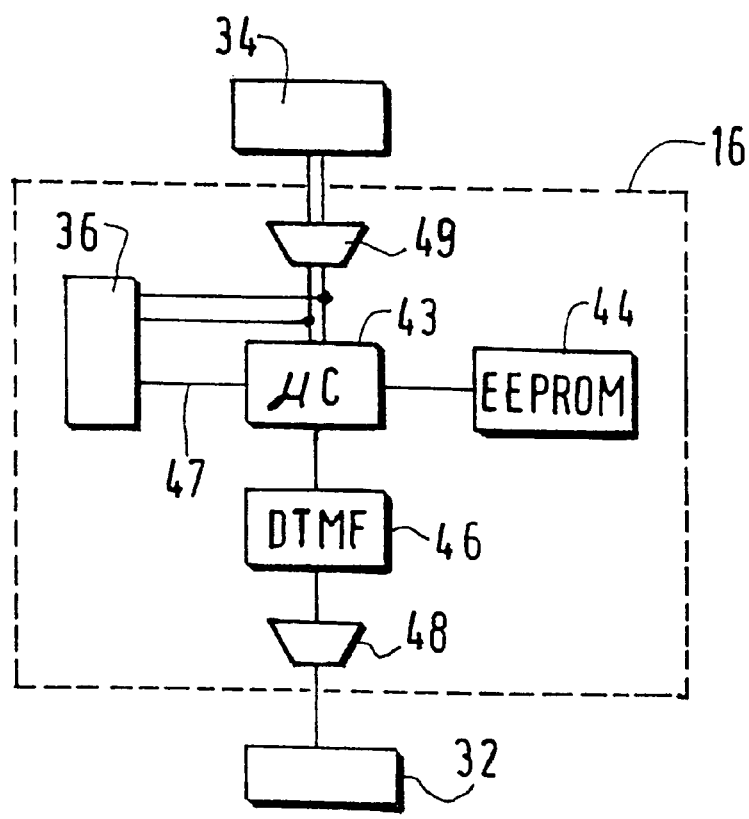
FIG. 4 represents a block diagram of an auxiliary device according to the invention.

FIG. 4 illustrates the operation of the charger 16 according to the invention. A 4-bits microcontroller ($\mu$C) 43 manages the exchanges of data between the connector 36, a memory of the EEPROM type 44 and a DTMF frequency generator 46.

The connector 36 detects the presence of the radio telephone via a conventional method called looping back. The connector 36 comprises a pin 47 whose voltage may assume two different values as a function of the presence or absence of the radio telephone. The reading of this voltage by the microcontroller 43 thus permits to detect the presence of the radio telephone on the charger.

Memory 44 is intended to store the digital DTMF call transfer sequences (varying with the networks of which one wishes to use the integrated call transfer means) and the call number of the station to which the transfer is to be effected. The programming of the EEPROM 44 may be realized at any moment and in simple manner by the known means.

The generator 46 permits to send the DTMF frequencies through the PSTN network via the line interface 48. A converter 49 is used for converting the AC current into DC current to feed the various components of the charger 16.

When the radio telephone 12 does not rest on the charger 16, the recharging loop is open and the voltage read on the pin 47 by the microcontroller 43 indicates the absence of the radio telephone. A time delay is then activated. If the voltage read on the pin 47 does not vary significantly before this time delay has expired, the microcontroller 43 will recognize the absence of the radio telephone and will read from the EEPROM 44 the sequence that corresponds to an activation of a call transfer for sending this sequence to the DTMF generator 46. This generator then sends the sequence over the network via the line interface 48.

When the radio telephone 12 rests on its charger 16, the recharging loop is closed and the voltage read by the microcontroller 43 on the pin 47 indicates the presence of the radio telephone. If this voltage does not vary before a time delay has elapsed, the microcontroller 43 will read from the EEPROM 44 the sequence that corresponds to a deactivation of a call transfer for sending this sequence to the DTMF generator 46 and after that to the PSTN network.

In another embodiment called "manual" embodiment of the invention, an activation or deactivation of a call transfer may be triggered by a manual control from an auxiliary device. This device then has the same characteristic features as the device represented with respect to FIG. 4 except that the charge connector 36 is substituted by an interface element which has, for example, a call transfer button intended to be activated by the user. The activation of this transfer control is then detected by the microcontroller 43 to effect or cancel a call transfer like in the embodiment called "automatic" described previously.

This "manual" embodiment is advantageous in the case where the user only wants call transfers to be systematically carried out when he uses his radio telephone away from the charger. In effect, according to the mode of operation of the invention, all the call transfers received on his radio telephone are billed to him. Such an embodiment called "manual" then brings the user more flexibility in the management of call transfers than the previously called "automatic" mode.

The invention obviously applies to other network systems than those illustrated in the Figures and is not restricted to the embodiments that have just been described and represented. Other variants of the invention will be clear to a person of ordinary skill in the art, more particularly, by substitution of equivalent technical means, and these variants do not go beyond the scope of the invention.

What is claimed is:

1. A method of transferring calls from a fixed station to a mobile station, said method comprising:

testing for a connection of said mobile station to an auxiliary device to form a test result;

waiting for a predetermined time;

repeating said testing; and activating a controller of said auxiliary device if said test result is unchanged after said predetermined period of time for transmitting first predefined messages from said auxiliary device to said integrated transfer means of said telecommunication network of said fixed station to transfer calls to said mobile station when said test result indicates absence of said connection, and for transmitting second predefined messages from said auxiliary device to said integrated transfer means to disable transfer of said calls to said mobile station when said test result indicates presence of said connection.

2. The method of claim 1, wherein said auxiliary device includes a charger of said mobile station.

3. The method of claim 1, wherein said auxiliary device is a support which receives said mobile station.

4. An auxiliary device for transferring calls from a fixed station to a mobile station, said auxiliary device comprising:

a connector which receives said mobile station;

a controller configured for testing a connection of said mobile station to said connector to form a test result; waiting for a predetermined time; repeating the testing to get said test result; and if said test result is unchanged after said predetermined period of time, transmitting first predefined messages from said auxiliary device to said integrated transfer means of said telecommunication network of said fixed station to transfer calls to said mobile station when said test result indicates absence of said connection, and transmitting second predefined messages from said auxiliary device to said integrated transfer means to disable transfer of said calls to said mobile station when said test result indicates presence of said connection.

5. The auxiliary device of claim 4, further comprising a charger of said mobile station.

6. The auxiliary device of claim 4 further comprising a support which receives said mobile station.

7. The method of claim 1 wherein the testing act forms said test result by reading a voltage value on a pin of said auxiliary device, said voltage assuming two different values as a function of absence and presence of said connection.

8. The auxiliary device of claim 4 wherein said test result is formed by reading a voltage value on a pin of said auxiliary device, said voltage assuming two different values as a function of absence and presence of said connection.

9. The method of claim 1, further comprising manually activating a call transfer button of said auxiliary device to activate said controller for transferring said calls to said mobile station.

10. The auxiliary device of claim 4, further comprising a call transfer button for manually activating said controller to transfer said calls to said mobile station.

11. A method of transferring calls from a fixed station to a mobile station, said method comprising:

testing for a connection of said mobile station to an auxiliary device to form a first test result;

waiting for a predetermined time;

testing for said connection of said mobile station to said auxiliary device to form a second test result;

activating a controller of said auxiliary device if said first test result is equal to said second test result for transmitting first predefined messages from said auxiliary device to said integrated transfer means of said telecommunication network of said fixed station to transfer calls to said mobile station when said test result indicates absence of said connection, and for transmitting second predefined messages from said auxiliary device to said integrated transfer means to disable transfer of said calls to said mobile station when said test result indicates presence of said connection.

* * * * *